H. W. DREWS.
MOLD.
APPLICATION FILED JUNE 13, 1921.

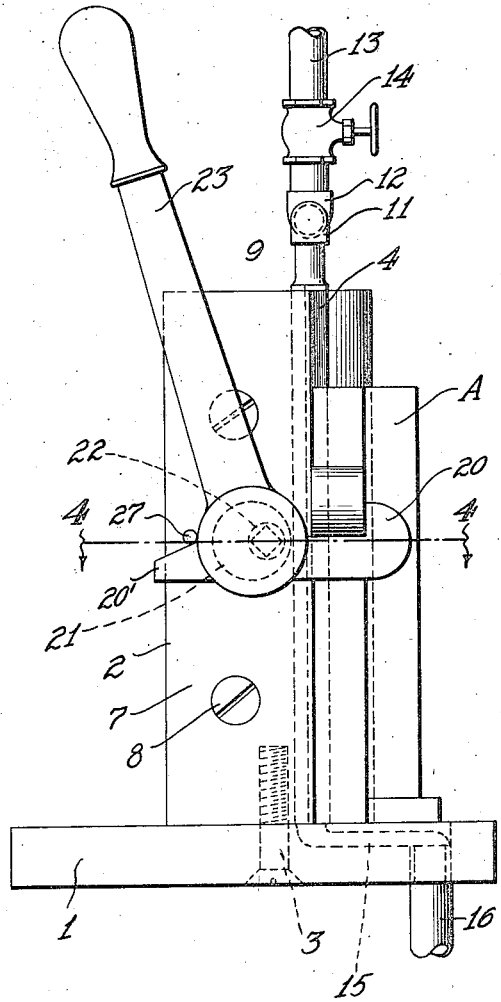
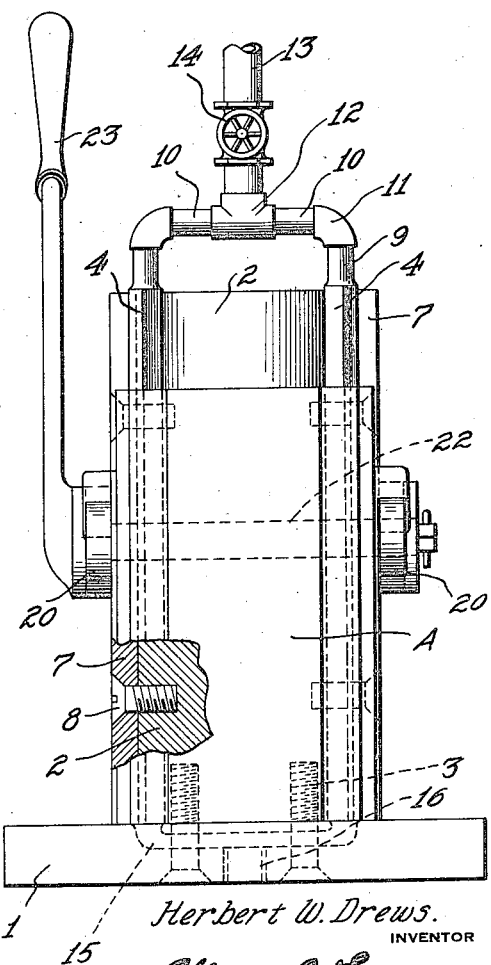

1,424,627.

Patented Aug. 1, 1922.
3 SHEETS—SHEET 2.

Herbert W. Drews.
INVENTOR

BY Victor J. Evans
ATTORNEY

WITNESS:

H. W. DREWS.
MOLD.
APPLICATION FILED JUNE 13, 1921.

1,424,627.

Patented Aug. 1, 1922.
3 SHEETS—SHEET 3.

Herbert W. Drews.
INVENTOR

BY Victor J. Evans
ATTORNEY

WITNESS:

UNITED STATES PATENT OFFICE.

HERBERT W. DREWS, OF DANVILLE, ILLINOIS.

MOLD.

1,424,627. Specification of Letters Patent. Patented Aug. 1, 1922.

Application filed June 13, 1921. Serial No. 477,212.

*To all whom it may concern:*

Be it known that I, HERBERT W. DREWS, a citizen of the United States, residing at Danville, in the county of Vermilion and State of Illinois, have invented new and useful Improvements in Molds, of which the following is a specification.

This invention relates to a mold for relining journal bearings, the general object of the invention being to provide means for walling in the concave face of the bearing so as to leave a space for receiving the lining material.

Another object of the invention is to provide means for cooling the edges of the bearing while the same is being formed.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3:
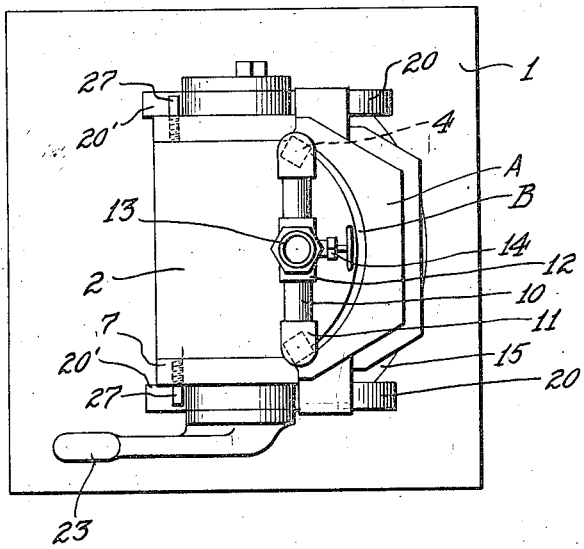
Figure 4:
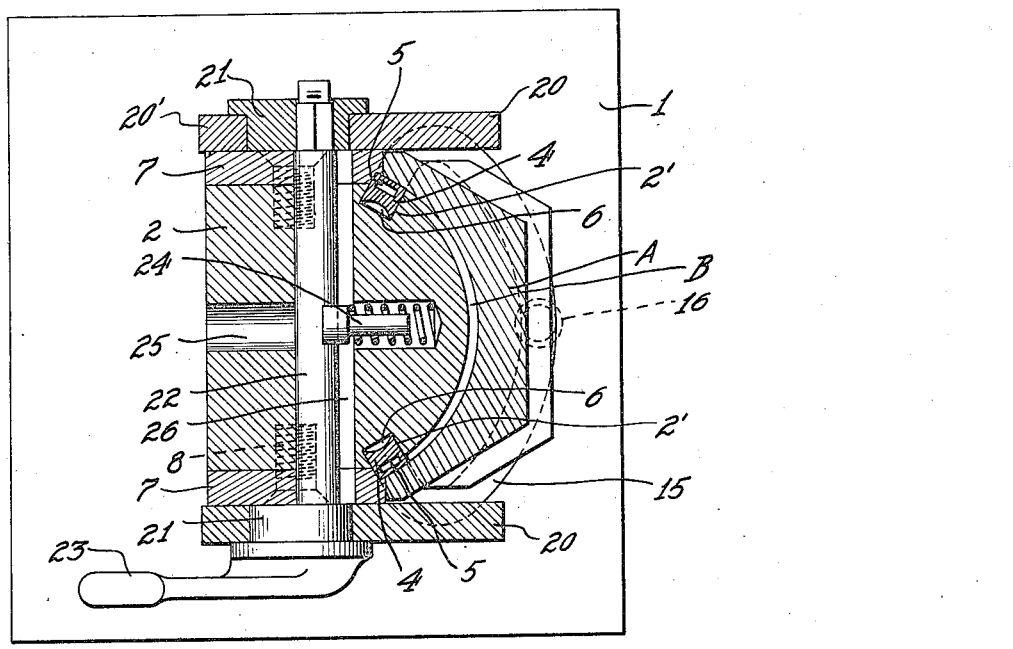
Figure 5:
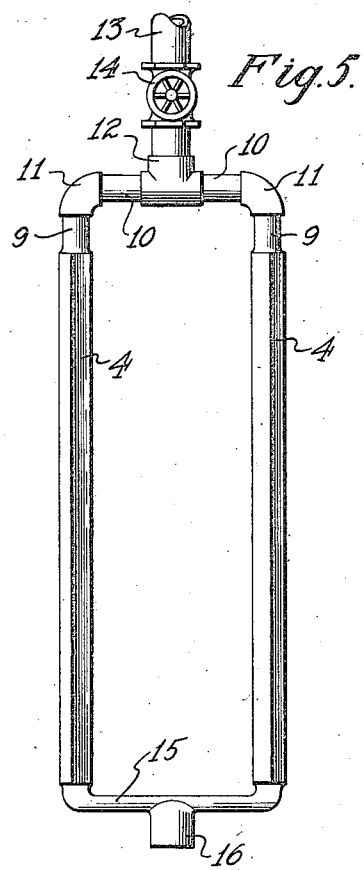
Figure 6:
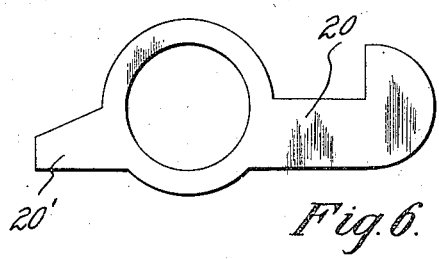
Figure 7:
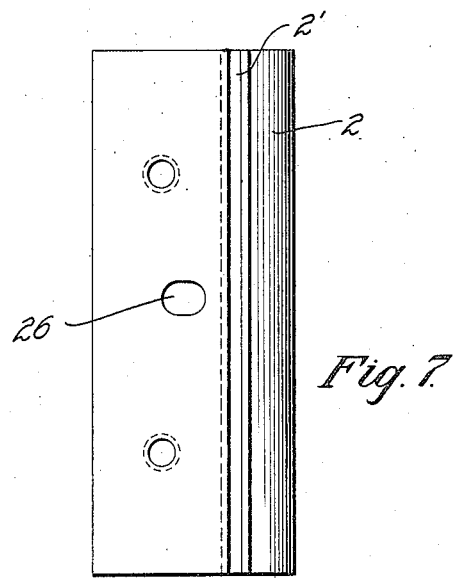
Figure 8:
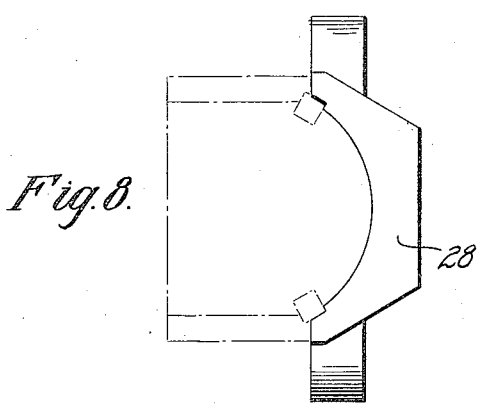
Figure 9:
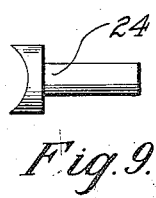

Figure 1 is a side view of the invention.
Figure 2 is a front view.
Figure 3 is a plan view.
Figure 4 is a section on line 4—4 of Figure 1.
Figure 5 is a view of the pipes for the cooling fluid.
Figures 6 and 7 are detail views.
Figure 8 is a view of the false bearing.
Figure 9 is a view of the plunger 24.

In these views 1 indicates a base and 2 indicates a mold member which is bolted to the base, as shown at 3. The member 2 carries a pair of strips 4 which are vertically arranged and are spaced apart, the space between the strips being equal to the width of the lining to be formed. Each strip is provided with a longitudinally extending square passage 5 and its rear face is provided with a longitudinally extending curved recess 6. These strips are held in place by the clamping strips 7 which are bolted to the member 2 by the screw bolts 8. The upper ends the passages 5 are suitably connected with the pipes 9, said pipes being connected with horizontal pipes 10 by the elbows 11 and the pipes 10 being connected together by the T-coupling 12. This coupling receives the supply pipe 13 in which is located the control valve 14. The lower ends of the passages 5 are in communication with the curved conduits 15 in the base which are in turn connected with the exhaust 16 in the base.

As shown in the drawings the member 2 is provided with longitudinal grooves 2' to receive portions of the strips 4 and I prefer to form these strips integral with the curved pipe 15' which forms the conduits 15. The base is grooved to receive this pipe. The strips and pipe can be slipped into place from the top and then clamped in position by the strips 7. This arrangement of parts will permit the pipes to be easily removed for the purposes of repairing the same or replacing them by new ones. By making the member 2 solid it will hold the heat which is an advantage as if the member cooled too quickly it would cause bubbles to appear in the moulded bearing.

Either water or compressed air can be circulated through the pipes for cooling the parts. The journal part A is placed with the ends of its curved face against the strips 4, the flanges of the journal resting against the edges of the clamping strips 7. Thus a space B is left between the curved face of the journal and the front part of member 2 into which the metal is to be poured to form the lining. As the metal is being poured the cooling fluid is caused to pass through the pipes and passages so as to keep the parts cool which in turn will cool the edges of the metal and the flow of this fluid is controlled by the valve 14.

From the above it will be apparent that the lining is easily and quickly molded to the journal and that both its faces and edges are smooth. As soon as the operation is completed the journal can be removed, a new one substituted and the operation repeated so that journals can be relined very easily and quickly.

The means for holding the journal part A in position comprises a pair of hooks 20 for engaging the lugs on the journal and which have openings therein which are engaged by eccentric parts 21 on the shaft 22 which passes through the member 2. The shaft is provided with a handle 23 by which it may be rocked to cause its eccentric parts to reciprocate the hooks 20. One eccentric part is detachably secured to the end of the shaft so as to permit the parts to be assembled.

In order to permit the device to be used with journals of varying sizes I provide a spring pressed plunger 24, seated in a bore 25, formed in the member 2 and having its curved end engaging a part of shaft 22 so that said shaft is held against the far side of the opening 26 in the member 2 in which the shaft is located and which is made considerable larger in diameter than the diameter of the shaft. Pins 27 are located in the clamping plates 7 and these pins engage projections 20' on the hooks 20, these parts being arranged to act as guides for the hooks and permitting the hooks to drop into a vertical position after they have been moved away from the journal.

The clamping hooks not only hold the journal in proper position with respect to the mold member 1 and its cooling pipes but also releases the journal after the cast has been made and the journal is "froze" to the mold member as the outward movement of the hooks will force the journal away from the mold member due to parts on the hooks striking the ears on the journal. The clamping movement of the hooks tends to force the journal down upon the bottom plate due to the downward movement of the hooks by the eccentric parts on the shaft as the hooks near the limit of their inward movement.

I also provide a false journal 28 for preheating the mold member 2 and its associated part, this false journal being so formed that it will contact with the curved face of the mold member and will not leave a space as the true journal will. This false journal is made of cast iron or steel and is first heated before being placed in position. After the mold is properly heated by the heat from the false journal, this false journal is removed and the journal to be refaced substituted therefor.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A mold of the class described comprising a member having a part thereof of the same curvature as the curved face of the journal to be relined, strips on the said member spaced apart a distance equal to the width of the lining and means for circulating cooling fluid through the strips.

2. A mold of the class described comprising a member having a part thereof of the same curvature as the curved face of the journal to be relined, strips on the said member spaced apart a distance equal to the width of the lining and means for circulating cooling fluid through the strips, said strips also having recesses therein for facilitating the cooling of the same.

3. A mold of the class described comprising a base, a mold member secured thereto, vertically arranged strips on said member spaced apart a distance equal to the width of the lining to be applied to the journal, said strips engaging the ends of the curved face of the journal, said strips having passages therein and means for circulating a cooling fluid through said passages.

4. A mold of the class described comprising a base, a mold member secured thereto, a pair of vertically arranged strips on said member spaced apart a distance equal to the width of lining to be applied to the journal, clamping strips on the member for holding said strips in place, said first mentioned strips having longitudinally extending passages therein, means for introducing a cooling fluid into said passages and an exhaust in the base for the fluid.

5. A mold of the class described comprising a base, a mold member connected therewith and provided with a curved face, means for clamping a journal in position upon the mold with a space between its concave face and the curved face of the mold member, hollow members at the sides of said space, means for passing a cooling fluid through said hollow members, said clamping means including sliding members.

6. A mold of the class described comprising a base, a mold member having a curved face adapted to be spaced from the concave face of the journal to be relined, hollow members for forming the sides of the space between the journal and the mold member, means for passing a fluid through said hollow members, clamping hooks for holding the journal in position, a shaft passing through the mold member and having eccentric parts thereon engaging the clamping hooks and means for rocking the shaft.

7. A mold of the class described comprising a base, a mold member having a curved face adapted to be spaced from the concaved face of the journal to be relined, hollow members for forming the sides of the space between the journal and the mold member, means for passing a fluid through said hollow members, clamping hooks for holding the journal in position, a shaft passing through the mold member and having eccentric parts thereon engaging the clamping hooks and means for rocking the shaft, the journal opening for the shaft being of larger diameter than the shaft and spring means for normally holding the shaft against the side of said opening opposite the journal.

8. A mold of the class described comprising a base, a mold member connected therewith, hollow members forming the sides of the mold space, means for passing a fluid through said hollow members, means for holding the journal to be relined in position and also for holding a false journal in position for pre-heating the parts.

In testimony whereof I affix my signature.

HERBERT W. DREWS.